United States Patent [19]

Machall et al.

[11] Patent Number: 5,204,929
[45] Date of Patent: Apr. 20, 1993

[54] FIBER PATCH PANEL

[75] Inventors: Gregory A. Machall, Schaumburg; James D. Zipper, Addison, both of Ill.

[73] Assignee: Reliance Comm/Tec Corporation, Chicago, Ill.

[21] Appl. No.: 754,659

[22] Filed: Sep. 4, 1991

[51] Int. Cl.5 .............................................. G02B 6/36
[52] U.S. Cl. ................................................... 385/135
[58] Field of Search ......................................... 385/135

[56] References Cited

U.S. PATENT DOCUMENTS

| | | | |
|---|---|---|---|
| 4,900,123 | 2/1990 | Barlow et al. | 350/96.20 |
| 4,971,421 | 11/1990 | Ori | 350/96.20 |
| 5,013,121 | 5/1991 | Anton et al. | 385/135 |
| 5,071,211 | 12/1991 | Debortoli et al. | 385/135 |
| 5,093,887 | 3/1992 | Witte | 385/135 |
| 5,100,221 | 3/1992 | Carney et al. | 385/135 |
| 5,121,456 | 6/1992 | Essert et al. | 385/70 |
| 5,127,851 | 7/1992 | Hilbert et al. | 439/532 |

FOREIGN PATENT DOCUMENTS 211208 2/1987 European Pat. Off. ............. 385/135

OTHER PUBLICATIONS

Reliance Comm/Tec, "Network Bay Frames for RMO-D-DSX Systems Description and Installation," Section RLEC 365-100-003, Issue 1, Feb. 1989.

Primary Examiner—Frank Gonzalez
Attorney, Agent, or Firm—Trexler, Bushnell, Giangiorgi & Blackstone

[57] ABSTRACT

A fiber optic patch panel module for accepting an optical fiber cable, and for use with telecommunications transmission networks mountable in an existing network bay frame designed for mounting electrically conductive wire patch panels comprises a housing having at least a top panel and a bottom panel. A mounting tang is disposed on the top panel, and a mounting notch is located on the bottom panel. The mounting notch is capable of accepting rail tangs of a shelf which in turn mounts to on the network bay frame. The patch panel is capable of pivotal movement about the rail tangs when the rail tangs are disposed in the mounting notch, and the mounting tang is capable of releasably engaging a rack rail on the shelf.

21 Claims, 4 Drawing Sheets

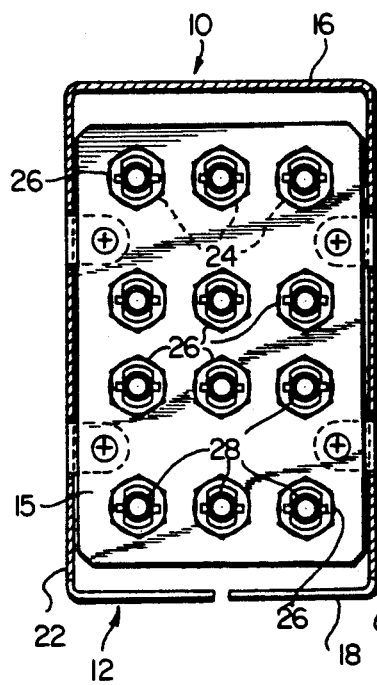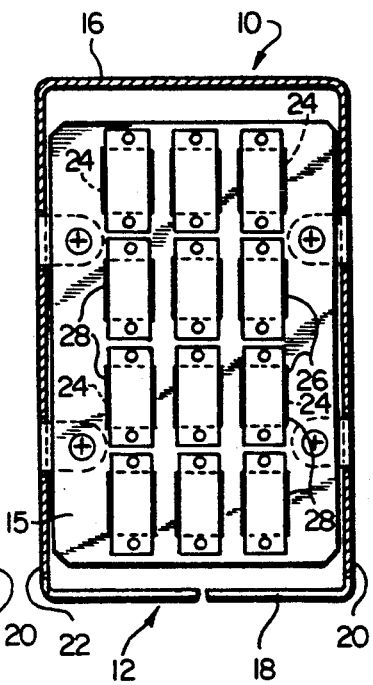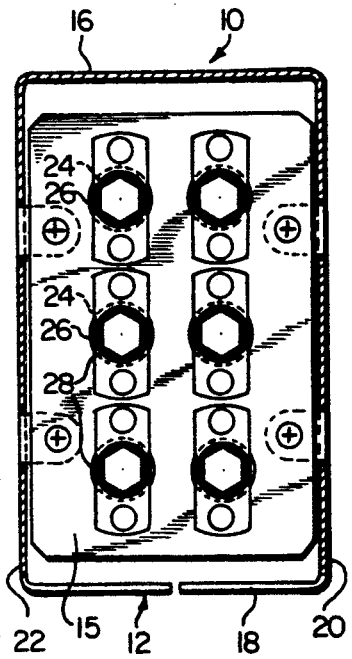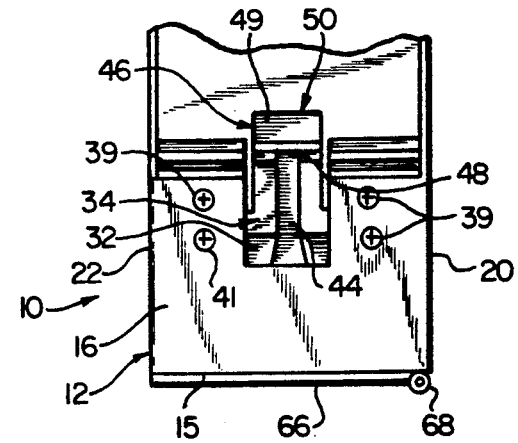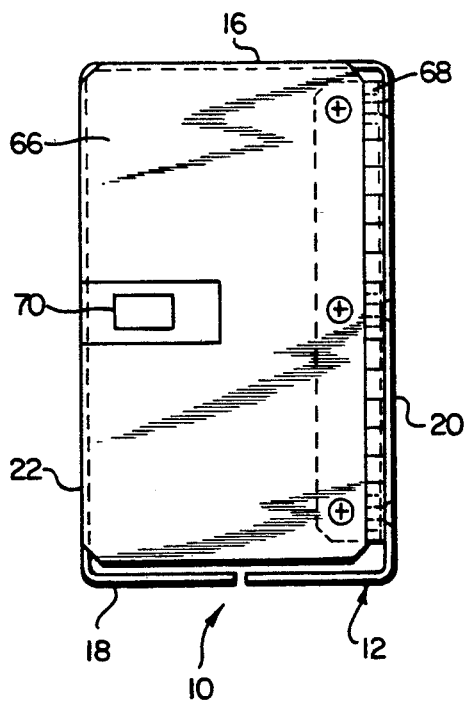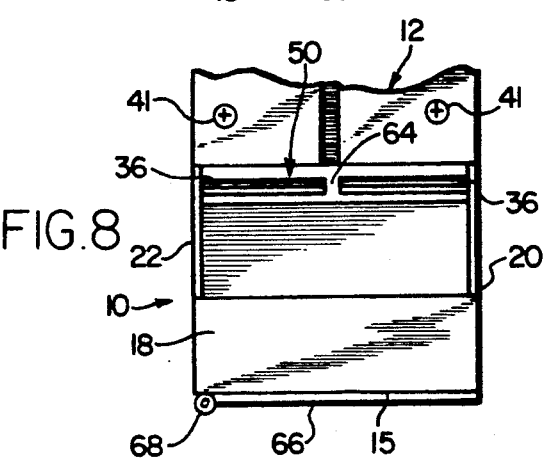

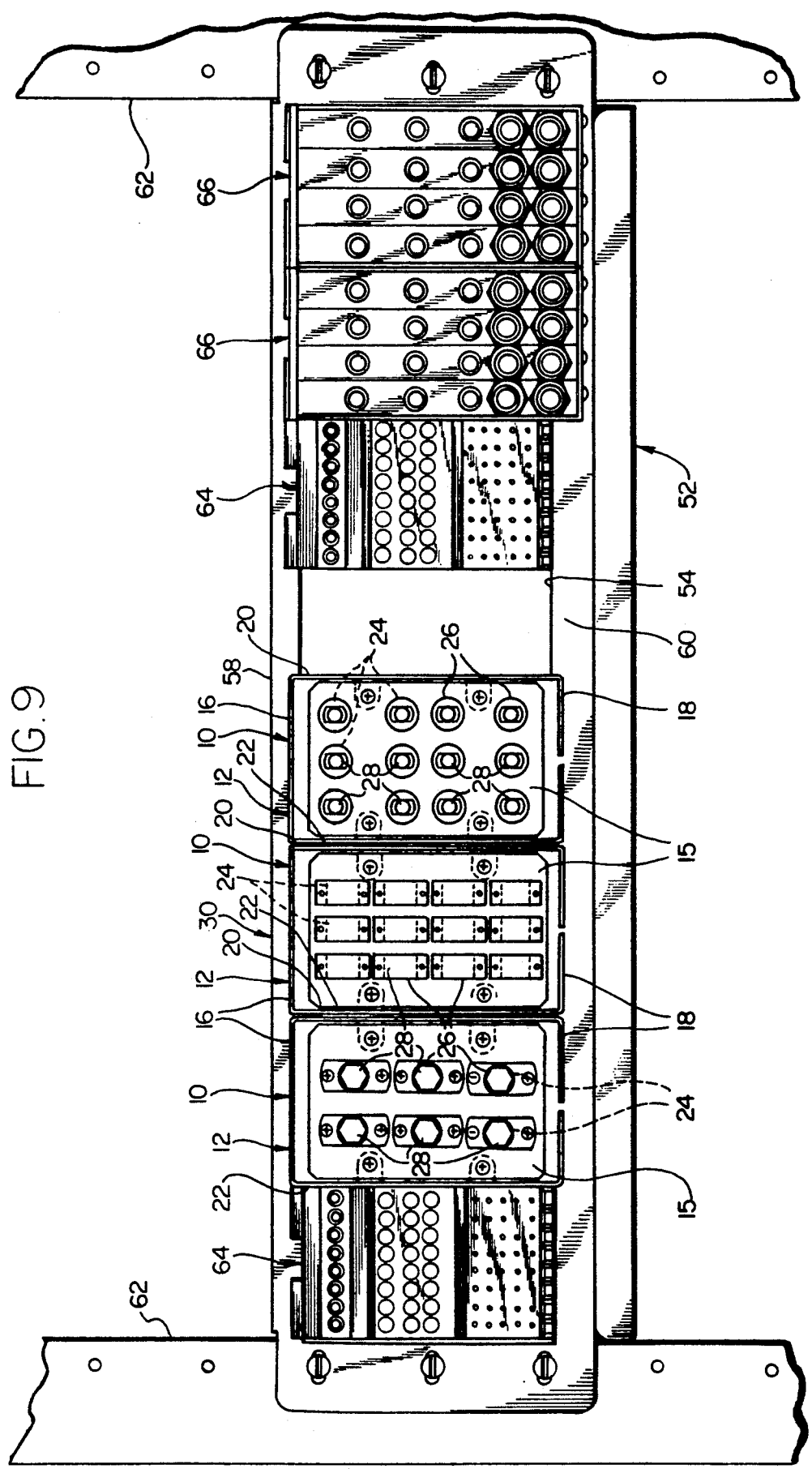

FIBER PATCH PANEL

BACKGROUND OF THE INVENTION

The present invention relates generally to a unique construction for a fiber optic telecommunications signal patch panel. More specifically, the invention relates to a unique construction of a fiber optic signal interconnect or cross-connect module which also has an external configuration substantially similar to a corresponding external configuration of existing digital or analog signal modules for electrical conductors. This allows the fiber optic module to be inserted into and mounted on a rack on a network bay frame commonly used in mounting a panel of digital or analog telecommunications signal modules.

In modern telecommunications systems or networks, operators thereof are constantly in search of means for providing greater clarity and speed of transmissions. This has become particularly important with the advent of facsimile machines, centralized databases, and modems connected to computers. Each of these devices utilize telecommunications networks to perform their respective functions.

In the case of facsimile machines, for instance, telecommunications transmission lines and networks are used to transmit electronic information regarding the contents of a printed document from one location to another. In order for the receiver of a facsimile transmission to receive an accurate and clear copy of the document in the possession of the transmitter, the telecommunications lines, as well as all other related telecommunications equipment present in the network, must perform at an appropriate speed or baud rate.

Also, those same lines and equipment must be capable of accepting a signal from the transmitter's facsimile machine and delivering it to the receiver's facsimile machine without significant distortion. If distortion occurs, the document produced by the receiver's facsimile machine may be illegible. The distortion can also adversely affect voice transmissions, resulting in unintelligible and garbled communications.

Similar specifications are required when using a computer at one location to access a centralized database or another computer at a different location by means of a modem. Problems similar to those discussed hereinabove arise if the computer signal transmission is distorted. This is quite undesirable when dealing with computer programs because the distortion may affect only one line of a program possibly having thousands of lines of code, thereby making debugging incredibly difficult and time consuming.

Due to the current advances in telecommunications and electronic technology, operators and users of telecommunications networks alike are constantly in search of better and faster telecommunications equipment in order to improve signal transmission speed and quality.

When telecommunications networks were originally constructed, they used analog transmission technology. As the state of the art advanced, the analog components are replaced by faster, digital components. The digital components offer greater transmission clarity, thereby reducing the possibility of signal distortion during transmission.

However, the replacement of the analog components is quite costly in money, material and time because the entire supporting superstructure often has to be replaced, due to the incompatibility of the external configurations of the newer equipment with the constructions of the network bay frames and racks used to mount the older equipment. This high cost replacement continues as older digital telecommunications equipment is replaced by newer, substantially faster digital equipment. The frequency of replacement is high due to the almost daily advances made in digital technology.

Currently, many of the older, electrical conductor or metallic (e.g. copper) wire telecommunications transmission lines are being replaced by optical fiber transmission cables. The use of optical fiber cables results in even greater transmission speeds and further refinement of signal clarity. However, to use the superior optical fiber transmission technology, certain cross-connects and other telecommunications equipment, adapted especially for use with optical fiber transmissions must be used.

Thus, the older digital equipment has to be replaced by the fiber optic equipment. Due to the size and configuration incompatibility between the fiber optic equipment and the digital equipment superstructure, the same high cost replacement scenario detailed above occurs.

In order to keep the costs of equipment replacement as low as possible, the present invention provides a uniquely constructed fiber optic cross-connect type device or module which is compatible with an existing electrical conductor cross-connect superstructure. The uniquely constructed fiber optic module fits directly into the apertures and spaces which were designed to accept older and slower digital equipment for use with electrical conductor transmission lines.

Specifically, the fiber optic cross-connect of the present invention has an external mounting configuration or "footprint" which allows it to be mounted in the rack space designed for, or previously occupied by older equipment, and in substantially the same fashion as the older equipment.

With the use of the fiber optic cross-connect, constructed according to the teachings of the present invention, newer, faster fiber optic equipment can be installed either together with existing equipment or as a replacement of older equipment without having to remove or re-configure the existing telecommunications superstructure, thereby reducing network down time and lost revenues.

Some typical prior art fiber optic interconnect or cross-connect equipment is shown in U.S. Pat. No. 4,971,421, issued on Nov. 20, 1990, and in U.S. Pat. No. 5,093,887, issued on Mar. 3, 1992, both of which are commonly owned with this application.

This equipment has a relatively large and bulky external configuration, such that it would be difficult or impossible to mount this equipment in existing digital cross-connect superstructures or "racks." Even if this equipment were mounted in such racks, it would occupy an excessive amount of space, leaving insufficient space for the number and types of cross-connects and other related equipment commonly desired in such installations.

OBJECT AND SUMMARY OF THE INVENTION

A general object of the present invention is to provide a fiber optic patch panel capable of being mounted on an existing network bay frame constructed to mount metallic wire patch panels thereon.

A more specific object of the invention is to provide a fiber optic cross-connect type of device in modular form having an external mounting configuration and overall external dimensions substantially similar to a corresponding external mounting configuration and dimensions of a digital cross-connect of the type used for wire conductor-type telecommunications lines.

Another object of the present invention is to provide a fiber optic patch panel module mountable on a rack upon which such digital patch panels are also mounted.

A further object of the invention is to provide a fiber optic patch panel module having a construction that helps to reduce the amount of system downtime needed to replace equipment.

A fiber optic patch panel module, constructed according to the teachings of the present invention, for use with telecommunications transmission networks mountable in an existing network bay rack designed for mounting electrically conductive wire patch panels comprises a housing having at least a top panel and a bottom panel. A mounting tang is disposed on the top panel, and a mounting notch is located on the bottom panel. The mounting notch is capable of accepting rail tangs on the network bay rack. The patch panel is pivotally movable about the rail tangs when the rail tangs are disposed in the mounting notch, and the mounting tang is capable of releasably engaging a rack rail on the network bay rack.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in which like reference numerals identify like elements, and in which:

FIG. 3 is a front elevational view of a fiber optic patch panel, with its front cover open, having ST-type connectors;

FIG. 4 is a view similar to that of FIG. 3 of a fiber optic patch panel having SC-type connectors;

FIG. 5 is a view similar to that of FIG. 4 of a fiber optic patch panel having BA-type connectors;

FIG. 6 is a frontal elevational view of the fiber optic patch panel of FIG. 2 with its front cover closed;

FIG. 7 is a partial plan view of the mounting tongue disposed on the top panel of the patch panel of FIG. 1;

FIG. 8 is a partial plan view of the mounting notch disposed on the bottom panel of the patch panel of FIG. 1;

FIG. 9 is a reduced elevational view of a network bay frame shelf upon which are mounted digital signal patch panels having various transmission rates and fiber optic patch panels of the present invention; and;

DETAILED DESCRIPTION OF THE ILLUSTRATED EMBODIMENT

Figure 1:
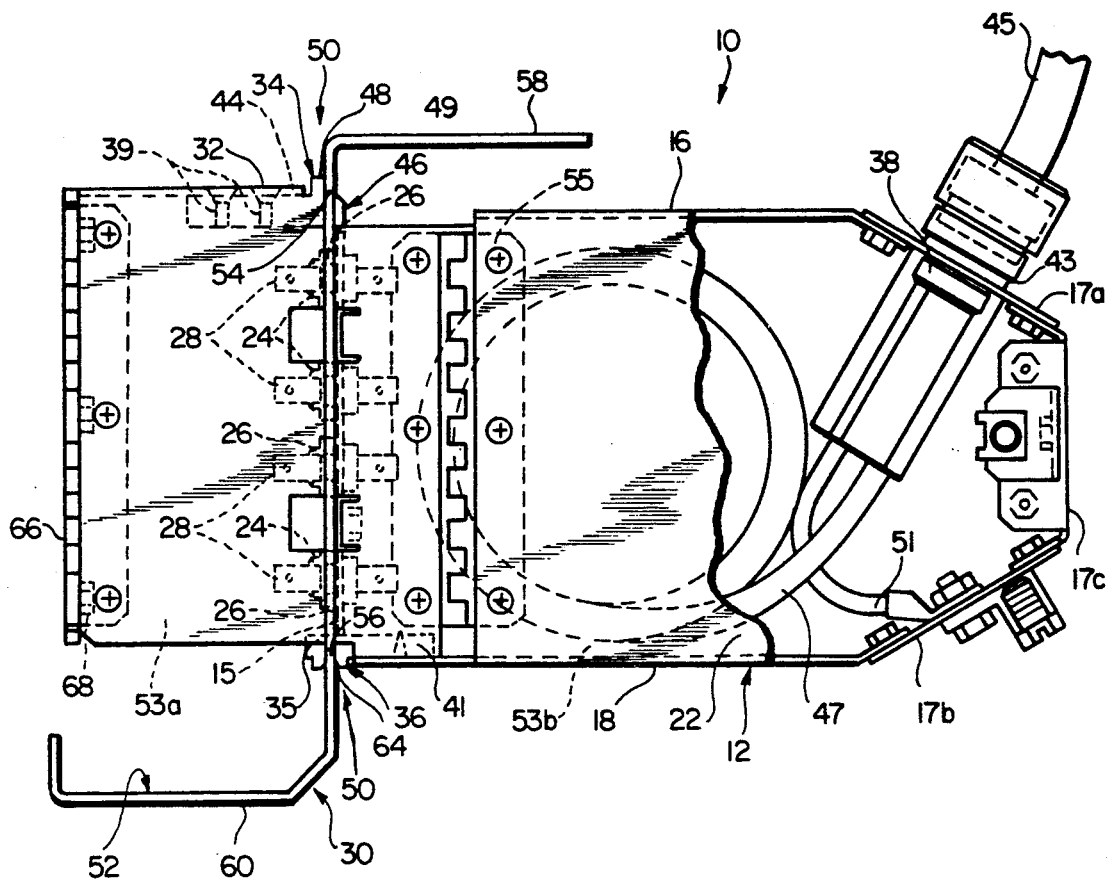
FIG. 1 is a partially sectioned side elevational view of a fiber optic patch panel, constructed according to the teachings of the present invention, mounted onto a rack of a network bay frame.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to what is illustrated and described herein.

Referring initially to FIG. 1, a fiber optic patch panel module 10 is shown. The module 10 is in the form of a unit, which, as the name suggests, may be modular in form, and which can be easily inserted into an existing rack or shelf on a network bay frame 62 in order to replace existing equipment, or to expand existing telecommunications capacity. Importantly, the module 10 is dimensioned externally such that it fits into substantially the same space normally allocated on the shelf or rack and in the network bay frame for existing equipment used for electrically conductive wire telecommunications lines.

The module 10 houses equipment necessary for the proper monitoring and transmission of fiber optic-carried telecommunications signals between respective fiber optic transmission cables to be interconnected thereat. As mentioned, the module 10 is constructed so as to be insertable into a space on a rack of an existing network bay frame 62 currently allocated for electrically conductive wire patch panels. This sort of construction gives an operator of a telecommunications network great flexibility in repairing and upgrading the network.

It is to be noted that this construction allows the fiber optic module 10 to be mounted substantially similarly to the front cross-connect/8 termination modular DSX unit sold by Reliable Electric under the name RMOD-DSX 1, and also to the relatively high transmission rate digital signal metallic wire patch panel disclosed in U.S. Pat. No. 5,127,851 of Hilbert et al., issued on Jul. 7, 1992. That patent is assigned to the assignee of the present invention and the disclosure of that patent is incorporated herein by this reference.

Figure 2:
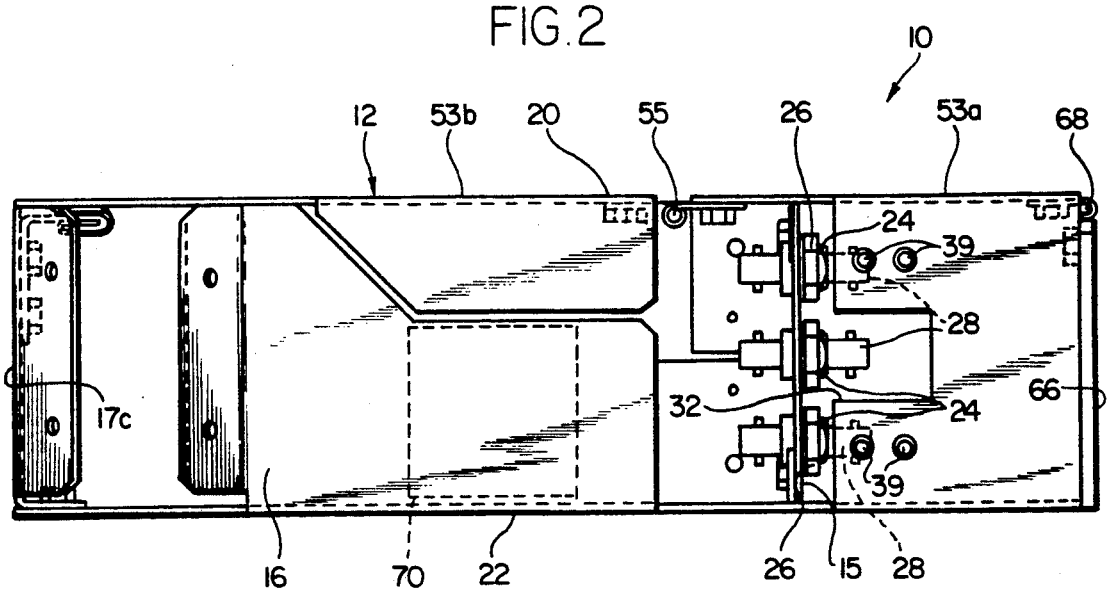
FIG. 2 is a top plan view of the fiber optic patch panel of FIG. 1 with a mounting tongue and an incoming fiber optic cable and related parts removed.

As clearly shown in FIG. 1 and FIG. 2, the module 10 is comprised of a housing 12 having a plurality of panels, including a top panel 16, a bottom panel 18, a first side panel 20, and a second side panel 22. All of the panels 16 through 22 are substantially smooth and planar, and may be composed of any firm, strong material, but preferably of metal.

The housing 12 has a face panel 15, shown clearly in FIGS. 3 through 5, which is substantially planar and vertical in nature. The face panel 15 is designed to project towards an aisle adjacent to which the network bay frame 62 is located in order to provide easy access thereto, as shown in FIG. 9.

The face panel 15 has a plurality of apertures 24 therein. As shown in FIGS. 2 through 5, these apertures 24 contain receptacles 26 for receiving fiber optic adapters 28. The receptacles 26 may be arranged as monitoring points which are used to monitor the patch panel connections for transmission clarity, for instance, or as in (IN) and out (O) connectors for patch paneling or patching incoming and outgoing fiber optic cables.

In the preferred construction, there are either six or twelve adapters 28 mounted in the receptacles 26. While the mounting configuration of the module 10 allows the same to be easily mounted on a network bay frame 62, the number of adapters 2 in part contributes to size reduction, compared to the substantially larger prior art fiber optic equipment described in the prior art patent and application referred to hereinabove. This provides greater network flexibility to the network operator, and also facilitates replacement of, or use with existing equipment.

The adapters 28 can take on a variety of forms, however, it is preferred that they be one of a number of known and widely used constructions commonly referred to as ST, SC, BA, SMA, FC, D4, and BICONIC. The ST, SC, and BA-types are shown respectively in FIGS. 3, 4, and 5.

Depending upon the particular application of the module 10, different embodiments thereof can be utilized. These different embodiments differ primarily in the type of adapter 28 used. Thus, as mentioned above, the adapters 28 can be of a construction commonly referred to as being of the ST-type, shown in FIG. 3, of the SC-type, shown in FIG. 4, or of the BA-type, shown in FIG. 5. It is to be understood that other types of adapters 28 can also be utilized effectively with the invention, such as those commonly referred to as SMA, FC, D4, and BICONIC.

In order to provide sufficient protection to the adapters 28, and to the connections made therewith, a hinged access door 66 is provided. Preferably, the hinged door 66 is shiftably mounted to one of the side panels 20 or 22 by means of a hinge 68. The access door 66 is dimensioned to cover the entirety of the face panel 15 which allows to cable access to the adapters 28 when closed. The access door 66 has a handle 70 thereon for facilitating opening and closing thereof.

The face panel 15 is bounded by the top panel 16, the bottom panel 18, the first side panel 20 and the second side panel 22. The top panel 16 and the bottom panel 18 define opposite boundaries of the face panel 15, and the first and second side panels 20 and 22, respectively, define opposite boundaries of the face panel 15 substantially perpendicular to the boundaries defined by the top and side panels 16 and 18.

The first and second side panels 20 and 22 extend substantially perpendicularly rearward from the face panel 15 at opposite ends thereof. The first and second side panels 20 and 22 extend rearward to a rear panels 17 of the housing 12 along corresponding sides of both. As shown in FIG. 1, the rear panels 17 join the top panel 16 to the bottom panel 18 on sides thereof opposite to the face panel 15.

Figure 10:
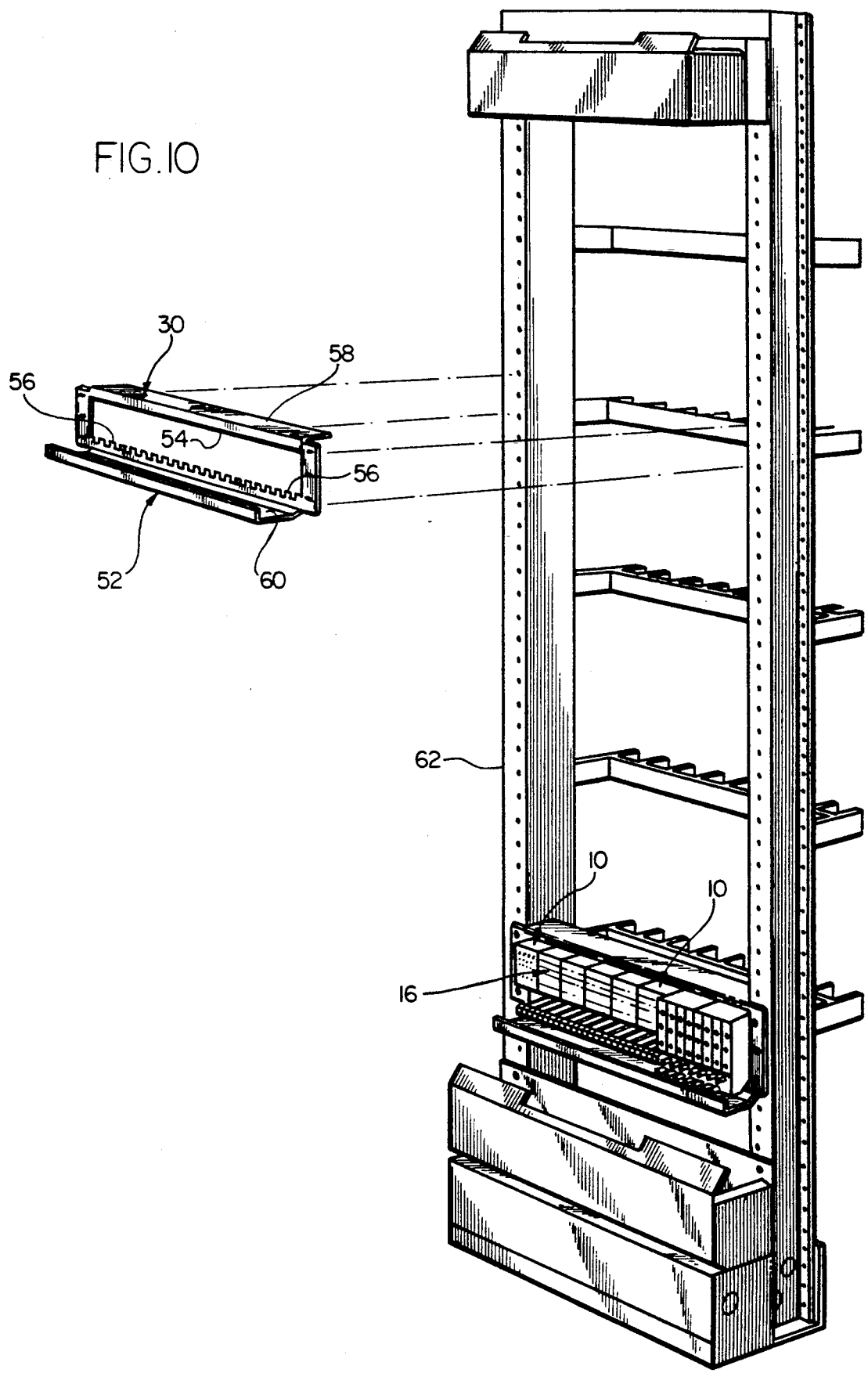
FIG. 10 is a perspective view of a network bay frame having shelves mounted thereon which may, in turn, have various patch panels mounted thereon, showing the installation of a shelf onto the rack.

The first and second side panels 20 and 22 are substantially planar and smooth, in order to allow for easy slidable movement of the module 10 into and out of a rack 30, shown in FIG. 9, on a network bay frame 62, shown in FIG. 10. The smoothness of the first and second side panels 20 and 22 also allow for uninhibited side-by-side disposition of the patch panels 10 on a rack 30, as shown in FIG. 9, in order to maximize available space thereon.

The top panel 16 is horizontal and extends substantially perpendicularly rearward away from the face panel 15 along a top portion thereof opposite to the bottom panel 18. The top panel 16 abuts the rear panels 17 and the face panel 15 along corresponding top edges of both, and connects the first side panel 20 with the second side panel 22 also along corresponding top edges thereof.

However, as shown in FIGS. 1 and 2, as the top panel 16 extends rearwardly towards the rear panels 17, the top panel 16 departs in one instance from its substantially flat nature. Specifically, a stepped or recessed portion 32 containing a tang or tongue 34 is disposed on the top panel 16 approximately centered midway between the first side panel 20 and the second side panel 22. The construction and function of the recessed portion 32 and the tang or tongue 34 will be discussed fully hereinafter. The recessed portion 32 and the tongue 34 do not extend through the entire front-to-rear length of the top panel 16.

It is to be noted that the tang or tongue 34 can be provided as a separate piece attached to the top panel 16 by means of fasteners 39. The piece bearing the tongue 34 can be molded from plastic, for example, or formed of another suitable material which can provide the tongue 34 with the desired characteristics, as will be described herein.

The bottom panel 18 is also constructed with the same objectives in mind as with the top panel 16. Specifically, as shown in FIG. 1, the bottom panel 18 abuts a bottom edge of the face panel 15 opposite to the edge thereof abutted by the top panel 16. The bottom panel 18 is substantially horizontal and extends rearward substantially perpendicularly to the face panel 15 towards the rear panels 17. The bottom panel 18 abuts the face panel 15 and the rear panels 17 along corresponding bottom edges of both.

However, as shown in FIG. 1, as the bottom panel 18 extends rearwardly towards the rear panels 17, the bottom panel 18 has a stepped or recessed portion 35, in which a mounting notch 36 is disposed across the bottom panel 18 extending from the first side panel 20 to the second side panel 22, as shown in FIG. 8.

The precise structure and function of the mounting notch 36 will become more clear hereinbelow. It is to be noted, however, that the mounting notch 36 can be provided as part of a piece separate from the housing 12 which can be mounted thereto by means of fasteners 41. The piece may be molded from plastic, or can be constructed of another suitable material by another method to give the mounting notch 36 its desired characteristics, as will be discussed hereinafter.

The rear panels 17 include symmetrical inwardly angled panels 17a, 17b, and a rearmost panel 17c, which substantially parallel to the face panel 15. The rear panel 17a has an aperture 38 therein for accepting an optical fiber accommodating bushing 43, illustrated in FIG. 1. The bushing 43 is preferably composed of an elastomeric material so as to effectively seal the interior of the housing 12 from ambient contaminants and to grip an optical fiber cable 45 inserted therein.

In the preferred construction illustrated in FIG. 1, the optical fiber cable 45 is inserted into the bushing 43 sufficiently to provide a fiber pig-tail 47. This pig-tail 47 can be pre-connectorized to the fiber optic equipment contained within the housing 12. To insure integrity of the pig-tail 47, the bushing 43, is provided with a ground connection 51 attached to the panel 17b. It will be noted that panels 17a and 17b may be reversed, with cable 45 entering from the bottom, if desired, without departing from the invention.

Additionally, the housing 12 is of sufficient dimensions to assure pig-tail 47 integrity. Specifically, the top, bottom, first and second side panels, 16, 18, 20, and 22, respectively, are of dimensions sufficient to allow and maintain a one and one-half inch minimum bend radius of the pig-tail 47 within the housing 12. This assures that the total internal reflection properties of the optical fibers of the cable 45 will be maintained, thereby preserving high signal transmission quality.

Furthermore, at least one of the side panels 20 and 22 can be comprised of at least two sub-panels 53a and 53b shiftably joined by a hinge 55. The hinge 55 allows the sub-panels 53b to pivotally shift with respect to the sub-panel 53a, which is fixedly mounted to the remainder of the housing 12. In the illustrated embodiment, a portion of the top panel 16 is split off and attached to the side sub-panel 53b to pivot in unison therewith. This allows a workman access to back plane wiring on the back side of the face panel 15, to telecommunications equipment contained within the housing 12, and to the pig-tail 47 for adjustment, repair, or replacement.

The cable 45 may extend away from the rack 62 to be connected elsewhere to an incoming central office (C.O.) cable. In this case, all of the components shown in FIG. 1, including cable 45 and bushing 38 are pre-assembled, and the optical fibers of cable 45 are connectorized and attached directly to appropriate ones of the adapters 28.

However, it is also within the scope of the invention to bring the C.O. cable directly to the module 10, as cable 45. In this case, splice connections are made within the housing 12 between the fibers of the C.O. cable 45, which is not pre-assembled with module 10, and further connectorized optical fibers which are pre-attached to the adapters 28. These splices are preferably made by splicers of the type shown and described in U.S. Pat. No. 5,121,456 of Essert et al., issued on Jun. 9, 1992, which is commonly owned herewith. Substantially symmetrically shaped and located areas 70 are provided on the top panel 16 and bottom panel 18 for accommodating these splicers.

Returning to the recessed portion 32 and the tongue 34, the precise structure thereof will now be described. The recessed portion 32 extends downwardly from a horizontal plane defined by the top panel 16 towards an interior of the housing 12, as shown in FIG. 7. Proximate to the bottom of the recessed portion 32 the tongue 34 is disposed.

The tongue 34 is composed of a flexible support member 44 and a locking member or head 46. One end of the support member 44 is attached to and extends from an interior wall of the recessed portion 32 with an opposite end of the support member 44 terminating at the head 46. The head 46 projects upwardly substantially perpendicularly away from the support member 44 to form a mounting tang 48. The support member 44 is preferably composed of a firmly flexible, resilient material so that the head 46 can be shifted between a locking and an unlocking position, as will be discussed herein. To facilitate the shifting of the head 46 into the locking position, the head 46 has an inclined face 49.

The mounting notch 36, along with the tongue 34 and the recessed portion 32, form housing mounting means 50 which mount the module 10 onto a shelf or rack 30 on a network bay frame 62, shown in FIGS. 7 and 10. The rack 30 is composed of a tray 52 having a rack rail 54 and rack tangs 56. The rack rail 54 and the rack tangs 56 extend along the entire length of the rack 30. The rack rail 54 extends downwardly from a top portion 58 of the rack 30, while the rack tangs 56 extend upwardly from a bottom portion 60 of the rack 30. The rack 30 is selectively mountable in any of a plurality of positions on a network bay frame 62 so that the frame 62 can bear a plurality of racks 30 and therefore a plurality of patch panels 10, as shown in FIG. 10.

As stated above, the module 10 is constructed so as to be insertable into the rack 30. Also, the precise external configuration of the patch panel housing 12, defined by the panels 16 through 22, is constructed to be insertable in the rack 30 in substantially the same space normally allocated for older, electrically conductive modules 64 and 66 (See FIG. 9). The patch panel housing 12 provides means for firmly holding itself within the rack 30. The patch panel housing 12 is mounted upon the rack 30 by means of the mating of the housing mounting means 50 with corresponding complementary mounting means, in the form of the rack rail 54 and the rack tangs 56, on the rack 30.

Accordingly, the mounting notch 36 is constructed so as to accept the rack tangs 56 when the module 10 is properly positioned in the rack 30. As shown in FIG. 1, the mounting notch 36 has a width somewhat larger than a corresponding width of the rack tangs 56. This allows the module 10 to pivot about the rack tangs 56. It is to be noted that the mounting notch 36 need not be continuous across the bottom panel 18. Indeed, the mounting notch 36 may be separated into a plurality of mounting notches 36 by a septum 64, as shown in FIG. 8. Also, the head 46 of the tongue 34 is constructed so as to apply a compressive force to the rack rail 54.

Further aspects of the unique function of the above-described fiber optic module 10 will become apparent in the following paragraphs. When equipment upgrades occur in a telecommunications network, the amount of time needed to implement the upgrade is substantially smaller with the use of the present invention. First, a workman must remove the old equipment, leaving an empty space on the rack 30 defined precisely by the dimensions of the old equipment. Because the module 10 is constructed so as to occupy that same, specifically dimensionally defined space, all the workman need do is to mount the new module 10 upon the rack 30.

In order to mount a module 10 on a rack 30, the workman must first position the module 10 within the empty space so that the rack tangs 56 are within the mounting notch 36 on the bottom panel 18 of the module 10. Because the width of the mounting notch 36 is larger than a corresponding width of the rack tangs 56, the module 10 is free to pivot about the rack tangs 56.

At this point, the workman pivots the patch panel upwards about the rack tangs 56 so that the inclined face 49 of the mounting tang 48 engages the rack rail 54. As the workman applies a progressively higher magnitude pivotal force, the rack rail 54 moves progressively along the inclined face 49, due to the fact that the pivoting of the module 10 causes a downwardly directed force to be applied to the inclined face 49, and therefore to the head 46.

This causes the tongue 34 to be depressed into the recessed portion 32 so that the mounting tang 48 can move downwards and behind the rack rail 54. Once this has been done, the tongue 34, due to the resiliency in the material composing it, returns towards its rest position, thereby bringing the mounting tang 48 and the head 46 upwards and into the locking position.

The housing mounting means 50 thereby forms a releasable snap-in type frictioned interference mount of the module 10 upon the rack 30. The module 10 is now firmly and releasably mounted to the rack 30, as shown in FIG. 9. The module 10 can be placed on a rack 30 with others of its kind, or it can be mixed with other metallic wire patch panels having different constructions on the same rack 30, or indeed with other rack-mounted equipment.

To release the module 10 from the rack 30 for repair or replacement, the workman must shift the head 46 and the mounting tang 48 into the unlocking position. To do this, the workman may use a tool 42, such as a screwdriver or the like. The workman places a tip of the tool 42 against the tongue 34 in close proximity to the rack rail 54 and the head 46.

The workman then applies a substantially downwardly directed force to the tool 42, thereby forcing the tongue 34 to move downwards into the recessed portion 32. This brings the mounting tang 48 out of contact with the rack rail 54. Simultaneously, the workman pivots the module 10 forward about the rack tangs 56 to free the module 10. Now, the workman can replace the module 10 or service the cables connected to the cable connectors 40 on the rear panel 14.

It is to be further noted that the configuration of the housing 12 and the positioning of the mounting means 50 (i.e. the positioning of the tang 48 and the notch 36 on the housing 12) relative to the housing 12 defines a spacing or relative orientation of the mounting means 50 which complements the orientation or spacing of the mounting elements of the rack 30. In this way, the mounting means 50 is capable of releasably engaging the complementary mounting means on the shelf or rack 30.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A fiber optic patch panel module for accepting an incoming optical fiber cable, and for use with telecommunications transmission networks and mountable on a shelf which is, in turn, mountable on an existing network bay frame designed for mounting electrically conductive wire patch panels, comprising: a housing having at least a top panel and a bottom panel; a mounting tang disposed on the top panel for releasably engaging a rack rail on the shelf; a mounting notch located on the bottom panel; and the mounting notch accepting at least one rail tang on the shelf such that the patch panel is pivotally movable about the rail tang when the rail tang is disposed in the mounting notch.

2. A fiber optic patch panel module as defined in claim 1 wherein the housing has external dimensions sufficient for permitting mounting of the housing on the shelf and for permitting mounting of the shelf on the network bay frame in a space substantially equal to an amount of space allocated for the electrically conductive wire patch panels on the shelf and the network bay frame.

3. A fiber optic patch panel module as defined in claim 2 wherein the housing has internal dimensions sufficient for maintaining a minimum bend radius of the optical fiber cable.

4. A fiber optic patch panel module as defined in claim 1 wherein the mounting tang is shiftable between a locking position and an unlocking position relative to the rack rail.

5. A fiber optic patch panel module as defined in claim 1 further comprising a recess disposed on the top panel, a resiliently bendable support member having a head disposed adjacent the recess, the support member being resiliently shiftable within the recess between a locking position and an unlocking position, and the mounting tang being disposed on the head.

6. A fiber optic patch panel module as defined in claim 1 wherein the mounting notch has a width substantially larger than a corresponding width of the rail tang.

7. A fiber optic patch panel module as defined in claim 1 wherein the patch panel module has a plurality of fiber optic adapters for receiving and patch paneling incoming and outgoing data transmission lines.

8. A fiber optic patch panel module as defined in claim 7 wherein the fiber optic adapters comprise one of ST-type, SC-type, and BA-type adapters.

9. A fiber optic patch panel module as defined in claim 2 wherein the mounting tang has an inclined face engagable with a rack rail for facilitating shifting of said tang between locking and unlocking positions for interengagement with said rack rail.

10. A fiber optic patch panel module as defined in claim 1 wherein the mounting notch is divided into a plurality of mounting notches by a septum.

11. A fiber optic patch panel module as defined in claim 1 further comprising a bushing disposed through the housing and configured for sealingly accepting the incoming optical fiber cable for protecting said optical fiber cable and the patch panel module from ambient contaminants.

12. A fiber optic patch panel module as defined in claim 3 wherein the minimum bend radius is substantially one and one-half inches.

13. A fiber optic patch panel module as defined in claim 11 further comprising a pre-connectorized optical fiber pig-tail disposed within the housing projecting from the incoming cable retained within the bushing.

14. A fiber optic patch panel module as defined in claim 1 further comprising strain-relief means disposed within the housing for relieving strain on the optical fiber.

15. A fiber optic patch panel module as defined in claim 7 further comprising a shiftable access door mounted to the housing by a hinge for protecting the adapters.

16. A fiber optic patch panel module for accepting an optical fiber cable, and for use with telecommunications transmission networks mountable on an existing network bay frame having corresponding first and second mounting means for mounting electrically conductive wire patch panels, comprising: a housing having housing mounting means for mounting said housing on said bay frame; a first part of the housing mounting means being shiftable between a locking position and an unlocking position; the first part of the housing mounting means being releasably matable with said corresponding first mounting means disposed on the network bay frame; and a second part of the housing mounting means being engagable with said corresponding second mounting means disposed on the network bay frame such that the housing is pivotally movable into a position for mating the first part of the housing mounting means with said corresponding first mounting means.

17. A fiber optic patch panel module as defined in claim 16 wherein the housing has internal dimensions sufficient for maintaining a minimum bend radius of the optical fiber cable.

18. A fiber optic patch panel module as defined in claim 16 wherein the housing mounting means provides a releasable snap-in mount between the housing and the corresponding first and second mounting means on the network bay frame.

19. A fiber optic patch panel module for accepting an optical fiber cable, and for use with telecommunications transmission networks mountable on an existing network bay frame having corresponding first and second mounting means for mounting electrically conductive wire patch panels, comprising: a housing having housing mounting means for mounting said housing on said bay frame; a first part of the housing mounting means being shiftable between a locking position and an unlocking position; the first part of the housing mounting means being releasably matable with said corresponding first mounting means disposed on the network bay frame; and a second part of the housing mounting means being engagable with said corresponding second mounting means disposed on the network bay frame such that the housing is pivotally movable into a position for mating the first part of the housing mounting means with said corresponding first mounting means; wherein the housing has external dimensions sufficient for permitting mounting of the housing on a shelf and for permitting mounting of the shelf on the network bay frame in a space substantially equal to an amount of space allocated for the electrically conductive wire patch panels on said shelf and said network bay frame.

20. A fiber optic patch panel module for accepting an optical fiber cable, and for use with telecommunications transmission networks mountable on an existing network bay frame having corresponding first and second mounting means for mounting electrically conductive wire patch panels, comprising: a housing having housing mounting means for mounting said housing on said bay frame; a first part of the housing mounting means being shiftable between a locking position and an unlocking position; the first part of the housing mounting means being releasably matable with said corresponding first mounting means disposed on the network bay frame; and a second part of the housing mounting means being engagable with said corresponding second mounting means disposed on the network bay frame such that the housing is pivotally movable into a position for mating the first part of the housing mounting means with said corresponding first mounting means; wherein the first part of the housing mounting means comprises a mounting tang, and the second part of the housing mounting means comprises a mounting patch.

21. A fiber optic patch panel module for accepting an incoming optical fiber cable, and for use with telecommunications transmission networks and mountable in a shelf which is, in turn, mountable to an existing network bay frame having complementary mounting means for mounting electrically conductive wire patch panels, comprising: a housing having at least a top panel and a bottom panel; mounting means disposed on the housing for engagement with said complementary mounting means located at predetermined relatively spaced orientations; and the mounting means on said housing releasably engaging the complementary mounting means on the shelf for releasably holding said module on said shelf.

* * * * *

UNITED STATES PATENT AND TRADEMARK OFFICE
CERTIFICATE OF CORRECTION

PATENT NO. : 5,204,929

DATED : April 20, 1993

INVENTOR(S) : Gregory A. Machall and James D. Zipper

It is certified that error appears in the above-identified patent and that said Letters Patent is hereby corrected as shown below:

Column 5, Line 1 "adapters 2" should be -- adapters 28 --

Column 12, Line 21 " mounting patch" should be -- mounting notch --

Signed and Sealed this

Eighth Day of March, 1994

*Attest:*

BRUCE LEHMAN

*Attesting Officer*   *Commissioner of Patents and Trademarks*